(12) United States Patent
Cao et al.

(10) Patent No.: US 12,602,603 B2
(45) Date of Patent: Apr. 14, 2026

(54) MULTI-AGENT INFERENCE

(71) Applicant: International Business Machines Corporation, Armonk, NY (US)

(72) Inventors: Li Cao, Beijing (CN); Yi Shan Jiang, Beijing (CN); Ze Ming Zhao, Beijing (CN); Hong Bo Peng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 17/330,099

(22) Filed: May 25, 2021

(65) Prior Publication Data

US 2022/0383149 A1     Dec. 1, 2022

(51) Int. Cl.
*G06N 5/04*        (2023.01)
*G06N 20/00*       (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

2013/0198755 A1* 8/2013 Kim ......................... G06F 9/505
                                                               718/104
2019/0156247 A1* 5/2019 Faulhaber, Jr. ........ G06N 3/045

| | | | |
|---|---|---|---|
| 2019/0294927 A1* | 9/2019 | Guttmann | G06F 18/29 |
| 2020/0174433 A1 | 6/2020 | Hughes et al. | |
| 2021/0019194 A1* | 1/2021 | Bahl | H04L 67/1031 |
| 2022/0138004 A1* | 5/2022 | Nandakumar | G06N 5/01 |
| | | | 718/102 |
| 2022/0141140 A1* | 5/2022 | Yang | G06N 3/04 |
| | | | 370/235 |
| 2022/0188700 A1* | 6/2022 | Khavronin | G06Q 30/0201 |
| 2022/0197773 A1* | 6/2022 | Butler | G06F 9/505 |
| 2024/0256973 A1* | 8/2024 | Vandikas | G06N 20/00 |

OTHER PUBLICATIONS

Merluzzi, M., Di Lorenzo, P., & Barbarossa, S. (Mar. 2021). Wireless edge machine learning: Resource allocation and trade-offs. IEEE Access, 9, 45377-45398. (Year: 2021).*
Schneider, S., Satheeschandran, N. P., Peuster, M., & Karl, H. (Jun. 2020). Machine learning for dynamic resource allocation in network function virtualization. In 2020 6th IEEE conference on network softwarization (NetSoft) (pp. 122-130). IEEE. (Year: 2020).*

(Continued)

*Primary Examiner* — Michael J Huntley
*Assistant Examiner* — Maggie Thanh Maido
(74) *Attorney, Agent, or Firm* — Yee & Associates, P.C.

(57) ABSTRACT

A computer-implemented method includes determining, by a master node, model update information at least based on a workload related to a task and a resource capacity of a computing environment. The model update information indicates respective model update suggestions for a plurality of inference models configured to perform the task. The method further includes distributing, by the master node, the model update information to a plurality of inference agents in the computing environment. The plurality of inference agents has a plurality of instances of the plurality of inference models executed thereon.

20 Claims, 10 Drawing Sheets

(56)                     References Cited

OTHER PUBLICATIONS

Kar, S., Moura, J. M., & Poor, H. V. (Apr. 2012). Qd-learning: A collaborative distributed strategy for multi-agent reinforcement learning through consensus. arXiv preprint arXiv:1205.0047. (Year: 2012).*

Hong et al., "A Deep Policy Inference Q-Network for Multi-Agent Systems," https://arxiv.org/pdf/1712.07893.pdf, Apr. 9, 2018, 9 pgs.

Mell et al., "The NIST Definition of Cloud Computing," Recommendations of the National Institute of Standards and Technology, U.S. Department of Commerce, Special Publication 800-145, Sep. 2011, 7 pgs.

Ralleanu et al., "Modeling Others Using Oneself in Multi-Agent Reinforcement Learning," https://arxiv.org/pdf/1802.09640.pdf, Mar. 23, 2018, 11 pgs.

* cited by examiner

700

INITIAL ACTION TABLE

| ACTION | M0 | M1 | M2 |
|---|---|---|---|
| UPGRADE | 1 | 0.5 | 0 |
| DOWNGRADE | 0 | 0.5 | 1 |

720

REWARD – MODEL_CHOOSE_TIMES TABLE

| MODEL/ REWARD | M0 | M1 | M2 |
|---|---|---|---|
| TIMES | 20 | 30 | 10 |
| REWARD | 0.5 | 0.8 | 0.1 |

MULTI-AGENT INFERENCE

BACKGROUND

The present disclosure generally relates to artificial intelligence (AI) techniques and, more particularly, to methods, systems, and computer program products for multi-agent inference.

AI technologies use machine learning to generate insights, rules, and algorithms from big data. The result of the machine learning may be an inference model, which can be applied to perform a corresponding task. As some examples, inference models can be applied to perform object detection from static or dynamic images, speech recognition, sensor data analysis, and so on. The inference models can be deployed in a computing environment as inference services to respond to requests from customers. As the machine learning algorithms develop, more data are collected, and/or different demands emerge, data scientists and companies continuously develop newer, larger, more accurate inference models for a same task.

SUMMARY

According to a first aspect of the present disclosure, there is provided a computer-implemented method and corresponding system and computer program product. The method includes determining, by a master node, model update information at least based on a workload related to a task and a resource capacity of a computing environment. The model update information indicates respective model update suggestions for a plurality of inference models configured to perform the task. The method further includes distributing, by the master node, the model update information to a plurality of inference agents in the computing environment. The plurality of inference agents has a plurality of instances of the plurality of inference models executed thereon.

The present subject matter may be advantageous as it may enable more efficient allocation and/or usage of computing resources in completing a task. Additionally, using a plurality of inference agents enables higher flexibility in handling requests for a task.

In accordance with at least one embodiment of the present disclosure, the respective model update suggestions may include at least one of a first probability and a second probability. The first probability may be a probability of upgrading a first inference model of the plurality of inference models to a second inference model of the plurality of inference models. The first inference model may have at least one of a lower quality of service and a lower resource consumption level than the second inference model. The second probability may be a probability of downgrading the first inference model to a third inference model of the plurality of inference models. The first inference model may have at least one of a higher quality of service and a higher resource consumption level than the third inference model.

The present subject matter may be advantageous as it may enable providing indications of model-specific update suggestions that use more or fewer computing resources in completing a task, where appropriate, which may thereby improve the overall efficiency of completing the task.

According to a second aspect of the present disclosure, there is provided a computer-implemented method and corresponding system and computer program product. The method includes launching, by an inference agent in a computing environment, a first instance of a first inference model of a plurality of inference models. The plurality of inference models is configured to perform a task. The method further includes receiving, from a master node and by the inference agent, at least a part of model update information indicating a model update suggestion for the first inference model. The method further includes determining, by the inference agent and at least based on the received part of model update information, a model update action of upgrade or downgrade of the first inference model to a further inference model of the plurality of inference models. The method further includes performing, by the inference agent, the model update action on the first instance of the first inference model.

The present subject matter may be advantageous as it may enable more efficient allocation and/or usage of computing resources in completing a task. Additionally, using a plurality of inference agents enables higher flexibility in handling requests for a task.

In accordance with at least one embodiment of the present disclosure, performing the model update action may include, in accordance with a determination that the model update action indicates the upgrade or the downgrade, launching a second instance of the further inference model on the inference agent.

The present subject matter may be advantageous as it may enable replacing the inference model with a different inference model that may improve the efficiency of computing resource usage in completing a task, which may thereby improve the overall efficiency of completing the task.

According to a third aspect of the present disclosure, there is provided a system. The system comprises one or more processing units and a memory coupled to the processing unit and storing instructions thereon. The instructions, when executed by the processing unit, perform acts of the method according to the first aspect of the present disclosure.

The present subject matter may be advantageous as it may enable more efficient allocation and/or usage of computing resources in completing a task. Additionally, using a plurality of inference agents enables higher flexibility in handling requests for a task.

The above summary is not intended to describe each illustrated embodiment or every implementation of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
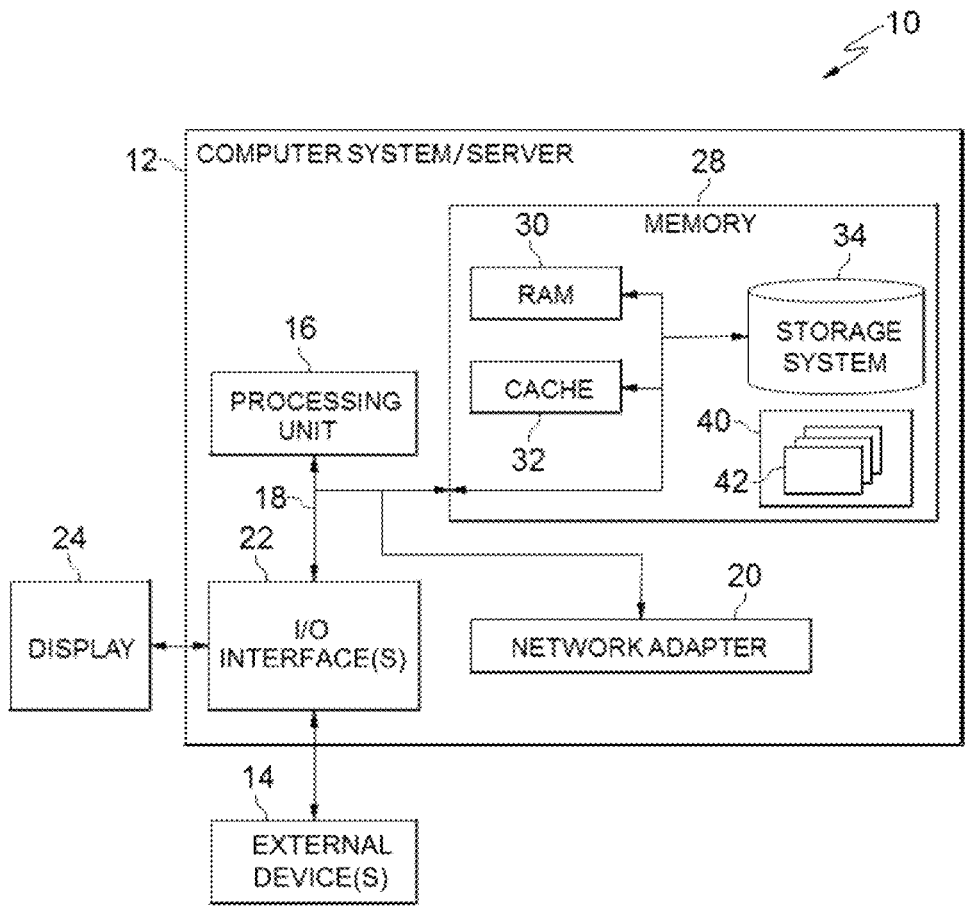
FIG. 1 depicts a cloud computing node, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth herein.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
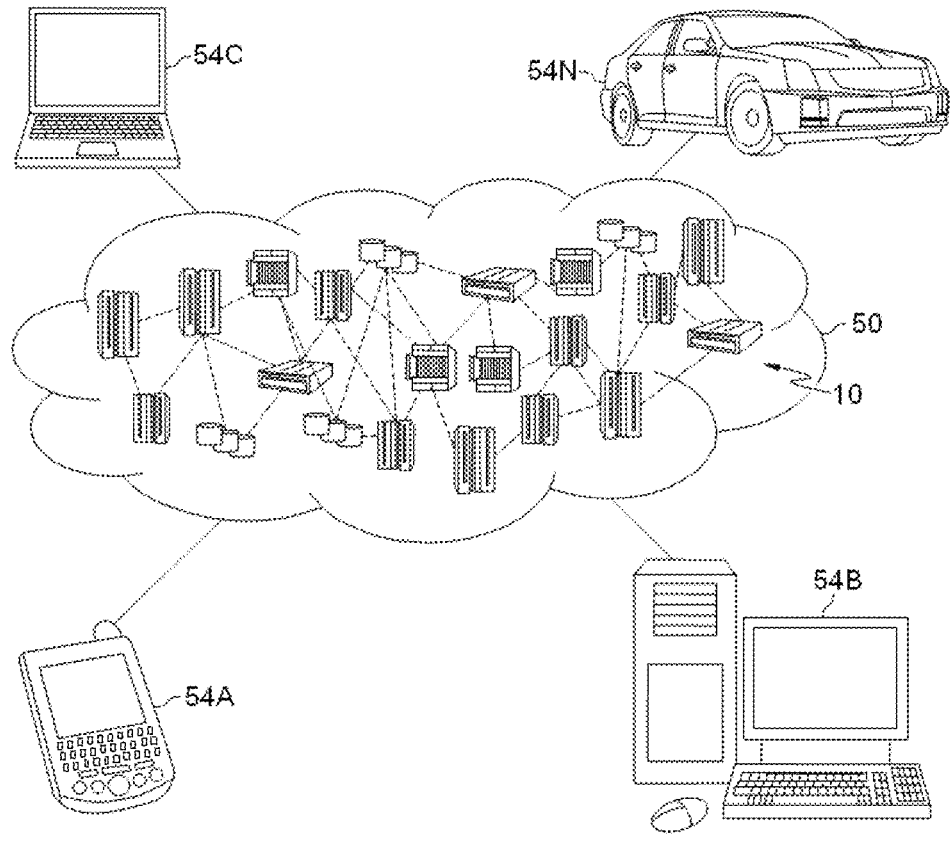
FIG. 2 depicts a cloud computing environment, in accordance with embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
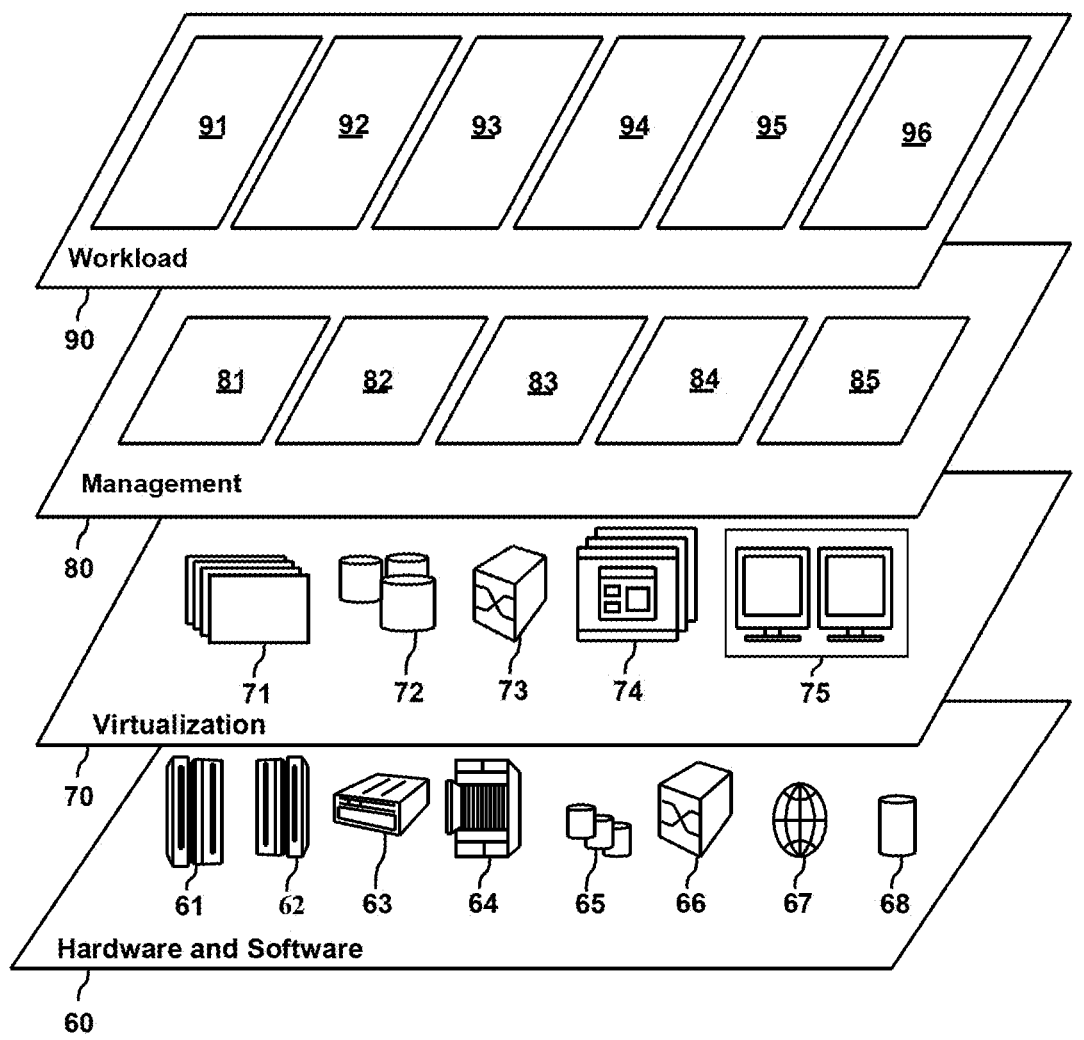
FIG. 3 depicts abstraction model layers, in accordance with embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-agent inference 96. Functionalities of multi-agent inference 96 will be described in the following embodiments of the present disclosure.

Performing machine learning usually involves the following three phrases: a training phase to train a model with training data; an evaluation/test phase to estimate how well the model has been trained by estimating the model accuracy (e.g., classification errors for classifiers) using an evaluation dataset and/or a test dataset; and an inference phrase to apply real-world data to the trained model to get results.

In general terms, an inference model is a result of a machine learning algorithm. An "inference model" may also be referred to herein as a "learning network," "learning model," "network model," or "model." These terms are used interchangeably hereinafter. A deep learning model is one example machine learning model, examples of which include a "neural network."

An inference model is designed to perform a corresponding task. Example tasks may include, for example, object detection from static or dynamic images, speech recognition, sensor data analysis, and so on. It is noted that the embodiments of the present disclosure are not limited in the specific tasks performed by the inference model.

An inference model may be deployed in a computing environment (e.g., a cloud environment) as inference services to respond to requests from customers. For example, a customer may request detection of a certain object from a video clip, and an inference model configured for object detection may be executed to process the video clip and provide the result of the object detection as a response to the request of the customer. The execution of the inference model may consume resources in the computing environment. In some cases, more than one instance of a specific inference model may be launched to handle requests from the customer in parallel.

Data scientists and companies continuously develop newer, larger, more accurate inference models for a same task. Those inference models may form a model sequence of versions for the task. Generally, an inference model with a higher accuracy may consume a relatively higher amount of resources than other inference models with relatively lower accuracy. In some applications, the most advanced inference model may be utilized to replace outmoded inference models in order to achieve the optimal model accuracy. In some applications, as the workload of the task changes, it is possible to scale in or scale out the inference models running in the computing environment.

However, the available resources in the computing environment for inference execution may be limited, and the workload for the inference services is changing. If more advanced inference models are deployed in the environment, the response times become longer as the resource consumption increases. The use of the advanced inference models is not elastic for workload or resource changes. Typically, it is desired to optimize the inference services at more than one objective, including, for example, low latency for the requests from the customers, high model accuracy, and the use of as little resources as possible given the current workload. There is a need to balance between these objectives, to achieve inference performance optimization.

In view of the above, according to embodiments of the present disclosure, there is proposed a solution for multi-agent inference. In this solution, instances of a plurality of inference models are executed on a plurality of inference agents. A master node can determine model update information to suggest model updates related to the plurality of inference models and distribute the model update information to the plurality of inference agents. The inference agents can determine model update actions under the direction of the suggestions from the master node and perform the model update actions accordingly, to upgrade or downgrade the inference models executed thereon.

Through the solution, the master node operates as a multi-agent master to guarantee the model inference optimization from a system perspective, and can react to the changing workload and the available resource capacity of the computing environment by means of the model update information. The solution offers an efficient way for the inference agents to achieve multi-objective optimization with a high quality of service and a high throughput using limited resources.

Other advantages of the present disclosure will be described with reference to the example embodiments and the accompanying drawings below.

Figure 4:
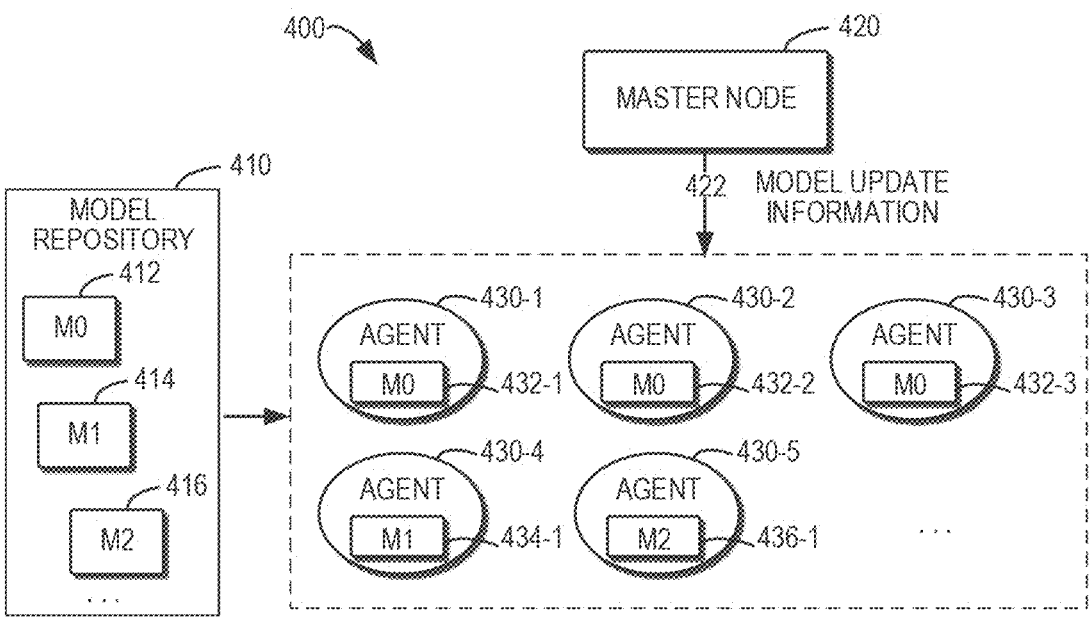
FIG. 4 depicts a block diagram of an example computing environment, in accordance with embodiments of the present disclosure.

FIG. 4 depicts a block diagram of an example computing environment 400 according to some embodiments of the present disclosure.

The computing environment 400 may include various infrastructure devices (e.g., hosts, servers, mainframes, etc.) to provide a pool of physical resources for supporting services running thereon. The resources provided in the computing environment 400 may include processing resources, memory, storage, network resources, and/or the like. In some embodiments, the computing environment 400 may be a cloud computing environment or a part thereof, such as a public cloud or a private cloud.

More than one inference model, including inference models 412, 414, and 416 (represented as M0, M1, and M2, respectively), are stored in a model repository 410. Those inference models are developed to perform a specific task but may be different at least in terms of quality of service (for example, accuracy, latency, and/or the like), and/or resource consumption. The differences between the inference models 412, 414, and 416 may be caused by different model configurations, different training algorithms, different training data, and/or the like.

As a specific example, for a task of object detection from an image, the inference model (M0) 412 may be configured with functions of color-separation, histogram, and correction to detect a target object. The inference model (M1) 414 may be configured with enhancements on the functions of the inference model (M0) 412 and can achieve a higher accuracy level in object detection. The inference model (M2) 416 may be further enhanced with functions of integration, Hessian, Laplace operations to speed up the robust features in the image from which the target object is to be detected. Thus, the inference model (M2) 416 may have a higher accuracy level than the inference model (M1) 414. One or more inference models for object detection may be continuously developed and stored in the model repository 410.

Generally, the quality of service of an inference model is directly related to the resource consumption (including processing resources and memory resources for execution, and storage resources for storing information on the model configuration) of that inference model. Thus, the inference model with the best accuracy may consume the largest amount of resources as compared with other inference models with relatively low accuracy. Likewise, the inference model with the lowest accuracy may consume the lowest amount of resources.

The inference models 412, 414, and 416 may be executed in the computing environment 400 to process a workload related to the task, for example, to perform object detection by processing images provided from the customer. According to embodiments of the present disclosure, there are a plurality of inference agents, for example, inference agents 430-1 to 430-5, hosted in the computing environment 400, onto which instances of the inference models 412, 414, and/or 416 are launched and executed. For convenience of discussion, the inference agents 430-1 to 430-5 are herein collectively or individually referred to as inference agents 430. In alternative embodiments, the computing environment 400 may host more or fewer inference agents than the number used in this illustrative embodiment. In embodiments of the present disclosure, instead of utilizing a particular inference model only, multi-agent inference allows a sequence of inference models executed to perform the task, providing a higher flexibility in handling requests for the task in different scenarios.

As used herein, an "inference agent" corresponds to a physical or virtual entity to which certain resources of a computing environment are allocated to execute an instance of an inference model. For example, an inference agent may be hosted in or may include a host device. A request to perform a task implemented by the inference model may be dispatched to the inference agent. The inference agent may execute the inference model to perform the corresponding task.

As used herein, an "instance" of an inference model refers to the particular inference model executed on a particular inference agent. For certain inference models, one or more instances may be executed on one or more inference agents. As illustrated in FIG. 4, instances 432-1, 432-2, and 432-3 of the inference model (M0) 412 are launched and executed on the inference agents 430-1, 430-2, and 430-3, respectively. In addition, an instance 434-1 of the inference model (M1) 414 is launched and executed on the inference agent 430-4, and an instance 436-1 of the inference model (M2) 416 is launched and executed on the inference agent 430-5.

According to embodiments of the present disclosure, the computing environment 400 further comprises a master node 420, which is configured to manage the inference agents 430 by suggesting model updates related to the inference models 412, 414, and 416 whose instances are executed on the inference agents 430. Specifically, the master node 420 determines model update information 422 indicating respective model update suggestions for the plurality of inference models 412, 414, and 416. The master node 420 is capable of determining the model update suggestions from a system perspective in order to achieve desired inference performance. In determining the model update information 422, the master node 420 may consider the workload related to the task of the inference models 412, 414, 416 and a resource capacity of the computing environment 400 for processing the task. In some embodiments, the master node 420 may determine the model update information 422 with the objectives of a high quality of service for the workload and a high throughput using the limited resources within the computing environment 400. The determination of the model update information 422 will be described in detail below.

The master node 420 distributes the determined model update information 422 to the inference agents 430. The inference agents 430 can perform a model update by taking the model update suggestions from the master node 420 into account. The inference agents 430 determine whether to upgrade or downgrade the inference models that are currently executed thereon based on the model update suggestions. In some cases, one or more of the inference agents 430 may determine to neither upgrade nor downgrade their inference models. If the specific model update actions are determined, the inference agents 430 can perform the model update action on the first instance of the first inference model. The model update by the inference agents 430 will be described in detail below with reference to FIGS. 8A and 8B.

It is noted that the numbers of inference models, their instances, and inference agents in FIG. 4 are provided for the purpose of illustration only. The computing environment 400 may comprise more, less, or different inference models, their instances, and inference agents. It is also noted that the components shown in FIG. 4, including the master node 420 and the inference agents 430, may be implemented as one or more software engines, components, or the like, which are configured with logic for implementing the functionality attributed to the particular module. Each component may be implemented using one or more of such software engines, components, or the like. The software engines, components, and the like are executed on one or more processors of one or more computing systems or devices and utilize or operate on data stored in one or more storage devices, memories, or the like, on one or more of the computing systems.

Figure 5:
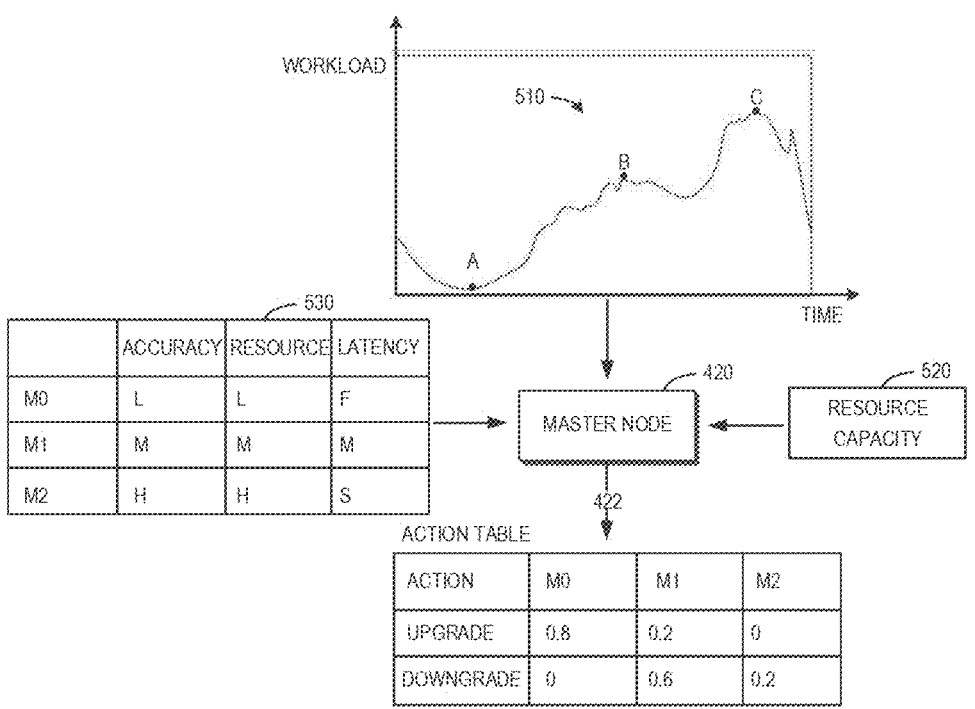
FIG. 5 depicts an example of model update information determination by a master node, in accordance with embodiments of the present disclosure.

Reference is now made to FIG. 5, which illustrates an example of model update information determination by the master node 420 according to some embodiments of the present disclosure. As illustrated, to determine the model update information 422, the master node 420 may obtain information 510 about a workload related to the task to be performed by the inference models 412, 414, and 416. The information 510 may indicate a workload changing curve over time. In some examples, the workload may be represented as the number of requests for the task from the customer.

The master node 420 may also obtain a resource capacity 520 of the computing environment. The resource capacity 520 indicates a total amount of resources that are available for processing the task. In some embodiments, during the model update, it is expected that the workload can be processed by the launched instances of inference models with a desired quality of service using the current resource capacity. Since the workload and the available resources may be changing, the master node 420 may periodically determine the model update information according to the current condition in the computing environment 400.

As mentioned above, the different inference models 412, 414, and 416 may have different qualities of service in performing the task. For example, the accuracy levels of the inference models 412, 414, and 416 may be different, where the more advanced inference model may have the higher accuracy level. Additionally, or alternatively, the latency level of the inference models may also be different, where the higher latency level indicates a longer response time to a request for the task. In some embodiments, the inference models 412, 414, and 416 may have different resource consumption levels. A resource consumption level for a certain inference model may indicate the amount of resources required for processing a request or a unit of workload by the inference model. In some cases, if an inference model is developed with a higher accuracy level, the resource consumption level of this inference model is also higher than other inference models because the accuracy increases generally means a more complicated algorithm and/or a larger model size.

In some embodiments, to determine model update information 422, the master node 420 may also obtain and consider information 530 indicating respective qualities of service (e.g., the accuracy levels, and/or the latency levels) and respective resource consumption levels of the inference models 412, 414, and 416 (represented as M0, M1, and M2, respectively). As illustrated, the information 530 may be represented as a table. In the "Accuracy" column, "L" in the row corresponding to inference model M0 indicates that inference model M0 has a low accuracy level, "M" in the row of inference model M1 indicates that inference model M1 has a middle accuracy level, and "H" in the row of inference model M2 indicates that inference model M2 has a high accuracy level. Likewise, "L," "M," and "H" in the "Resource" column indicate a low resource consumption level, a middle resource consumption level, and a high resource consumption level of inference models M0, M1, and M2, respectively. Similarly, "F," "M," and "S" in the "Latency" column indicate a high latency level with a fast response time, a middle latency level with a middle response time, and a low latency level with a slow response time for the inference models M0, M1, and M2, respectively. In some embodiments, instead of providing qualitative or comparative values, the accuracy levels, the latency levels, and/or the resource consumption levels may be indicated by quantitative or measured values. For example, an accuracy level may be indicated by a measured error rate in processing the task, a latency level may be indicated by a measured response time in processing the task, and a resource consumption level may be indicated by a measured amount(s) of one or more types of resources consumed in processing the task.

The master node 420 may determine the model update information 422 by considering at least the information 510 about the workload and the resource capacity 520 so as to guarantee that the workload can be processed by the instances of the inference models launched on the inference agents 430 with a reasonable response time using the available resource for the task. In some embodiments, the master node 420 may determine the model update information 422 based on one or more target objectives regarding the quality of service for the task or the total resource consumption. The master node 420 may determine model update suggestions for the inference models 412, 414, 416 such that expected improvement to one or more predetermined objective can be achieved by the model update in a condition of the workload and the resource capacity. For example, the model update suggestions can provide an improvement in accuracy for the task, an improvement in response time for the task, and/or an improvement in resource consumption for the task under the condition of the current workload related to the task and the current resource capacity in the computing environment 400.

In some embodiments, for a certain inference model, its model update suggestion in the model update information 422 may indicate whether it is to be upgraded or downgraded to another inference model among all the available inference models. The upgrade of a given inference model is to replace the inference model with another inference model with a higher quality of service (for example, a higher accuracy level and/or a lower latency level) than the given inference model. In some cases, the higher quality of service may indicate that the resource consumption level required by the other inference model is also higher than the given inference model. The downgrade of a given inference model is to replace the inference model with another inference model with a lower quality of service (for example, a lower accuracy level and/or a lower latency level) than the given inference model. In some cases, the lower quality of service may usually mean that the resource consumption level required by the other inference model is lower than the given inference model.

As for a certain inference model, its model update may involve a model update action of upgrade or a model update action of downgrade. In some embodiments, the master node 420 may determine the model update information 422 as an action table indicating suggested model update actions for the inference models 412, 414, and 416. In some embodiments, the model update information 422 may indicate probability information for the suggested model update actions.

That is, for each inference model, the model update information 422 may comprise a first probability of upgrading this inference model to another inference model with a higher accuracy level and/or a lower latency level (and thus a higher resource consumption level). For the same inference model, the model update information 422 may also comprise a second probability of downgrading this inference model to another inference model with a lower resource consumption level (and thus with a lower accuracy level and/or a higher latency level). In some cases, the inference models 412, 414, and 416 may be ranked by their accuracy levels, the latency levels, and the resource consumption levels. The upgrading or downgrading may involve updating an inference model to a next inference model in the ranked model sequence.

As illustrated in FIG. 5, the model update information 422 may be represented as an action table, which indicates that for the inference model M0, the master node 420 suggests upgrading the inference model M0 to the inference model M1 with a probability of 0.8. Since the inference model M0 has the lowest accuracy level in the model sequence of M0, M1, and M2, the probability of downgrading the inference model M0 is zero (0). The master node 420 also suggests in the action table that the inference model M1 can be upgraded to the inference model M2 with a probability of 0.2 and can be downgraded to the inference model M0 with a probability of 0.6. That is, in the condition of the current workload and resource capacity, it will help improve the inference performance if the inference model M1 has a higher probability to downgrade. Additionally, since the inference model M2 has the highest accuracy level, its probability of upgrading is zero (0) and the probability of downgrading the inference model M2 to the inference model M1 is 0.2.

Typically, in the computing environment 400 with a determined resource capacity, if the workload related to the task is at its lowest level (point A of the workload changing curve as indicated by the information 510), it may be easy to determine to launch instances of the most advanced inference model (the inference model (M2) 416) to achieve the highest quality of service. If the workload is at its highest level (point C of the workload changing curve), the inference model (M0) 412 may be deployed as much as possible in the computing environment 400 by sacrificing the accuracy in exchange for fast response time. If the workload is at a middle level (point B of the workload changing curve), it is possible to utilize the inference model (M1) 414 only, a combination of the inference model (M2) 416 and inference model (M0) 412, and/or the inference model (M1) 414 and any other combination of the available inference models.

Further, as the workload is changing over time, at a certain point of time, the workload may have a decrease trend or an increase trend. The master node 420 may balance the quality of service (e.g., the accuracy and the latency) and the resource consumption by controlling the respective numbers of instances of the inference models M0, M1, and M2 executed in the computing environment 400.

Figure 6A:
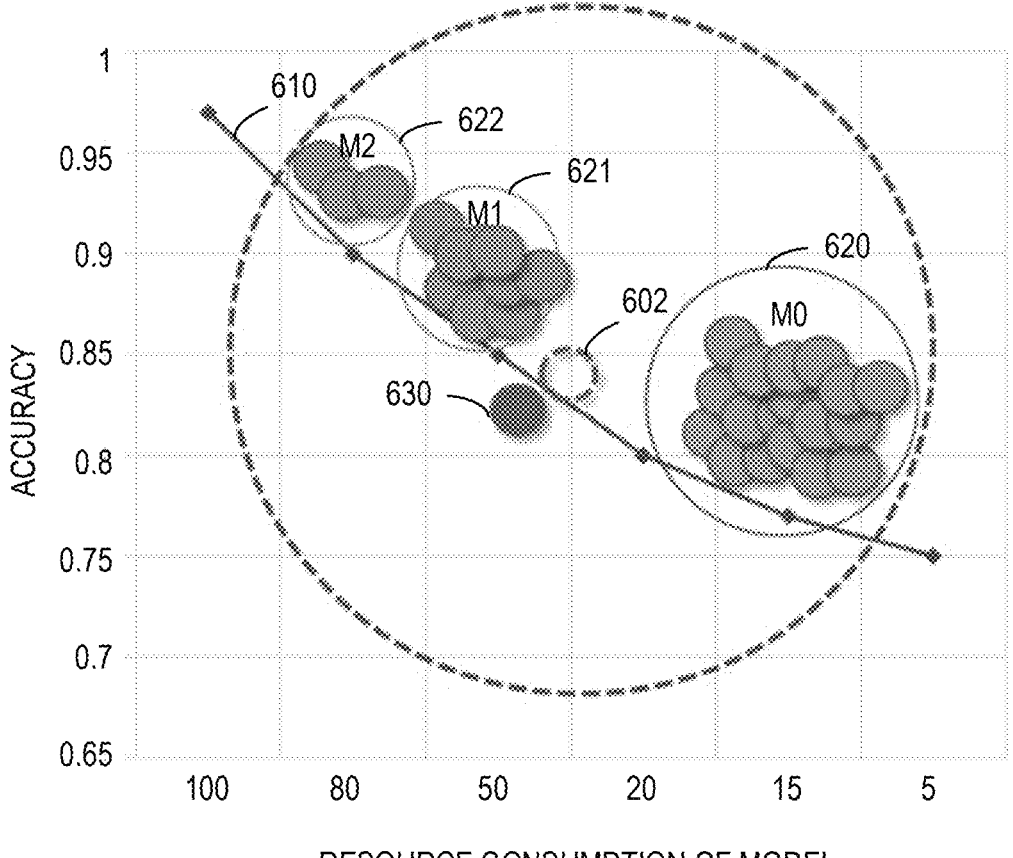
FIG. 6A depicts an example graph showing a relationship between accuracies and resource consumptions of different models, in accordance with embodiments of the present disclosure.

FIG. 6A depicts an example graph showing a relationship between accuracies and resource consumptions of the inference models 412, 414, and 416 according to some embodiments of the present disclosure.

As shown in FIG. 6A, since the inference model M0 has a relatively low resource consumption level and a relatively low accuracy level, an instance group 620 deployed in the computing environment 400 may include a relatively large number of instances of inference model M0. An instance group 621 for the inference model M1 may include a smaller number of instances than the instance group 620 as the accuracy level and resource consumption level increase. As for the inference model M2, an instance group 622 may include a smallest number of executed instances of the inference model M2 due to the highest accuracy level and resource consumption level.

A curve 610 indicates a resource capacity change of the computing environment 400. A point 602 indicates a certain resource capacity at a given point of time, and a point 630 indicates an equivalent inference model that is optimal for the resource capacity indicated by the point 602. The master node 420 may attempt to search for the equivalent optimal inference model and control respective numbers of instances of the inference models 412, 414, and 416 in order to approximate to the equivalent optimal inference model.

Figure 6B:
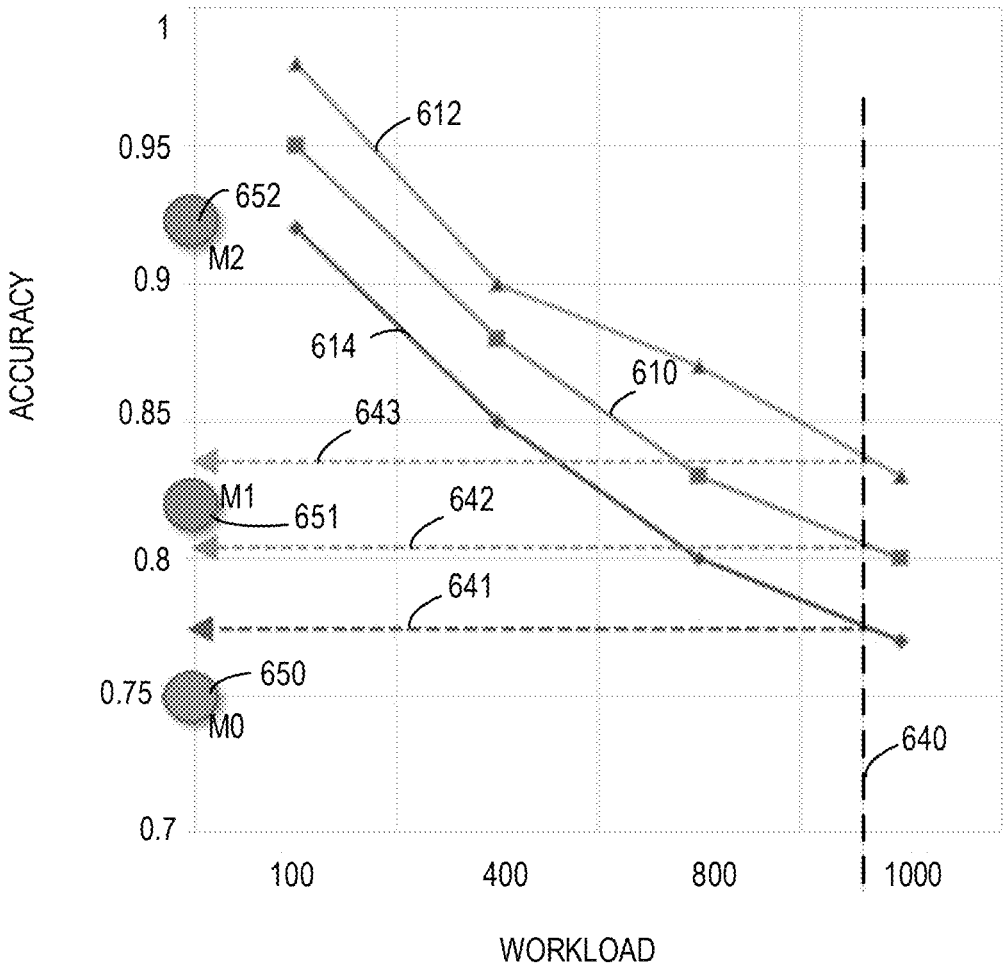
FIG. 6B depicts an example graph showing a relationship between accuracy and workloads, in accordance with embodiments of the present disclosure.

FIG. 6B depicts an example graph showing a relationship between accuracy and workloads according to some embodiments of the present disclosure. Points 650, 651, and 652 indicate the accuracy level of the inference models M0, M1, and M2, respectively. In addition to the curve 610, curves 612 and 614 are illustrated to indicate other possible resource capacity changes of the computing environment 400.

As illustrated in FIG. 6B, if the current workload related to the task includes 1,000 requests from customers, an arrow 641 points to the highest accuracy that can be achieved in the condition of the resource capacity indicated by the curve 614, an arrow 642 points to the highest accuracy achieved in the condition of the resource capacity indicated by the curve 610, and an arrow 643 points to the highest accuracy achieved in the condition of the resource capacity indicated by the curve 612.

As there is no inference model that can exactly provide the highest accuracy level in a specific condition of the resource capacity of the environment 400, the master node 420 may control respective numbers of executed instances of the inference models 412, 414, and 416 in order to approximate to the highest accuracy level.

The master node 420 may employ various optimization algorithms to determine the model update information 422 such that by following the model update suggestions, execution of instances of the inference models 412, 414, and/or 416 in the computing environment 400 can achieve the expected improvement to one or more predetermined objective.

In some embodiments, the master node 420 may apply an exploit-explore trade-off policy to determine the model update information 422, for example, the action table. The exploit-explore trade-off policy allows a certain degree of exploration when a certain inference model is assumed to be exploited. A reward of such exploration and exploitation among the inference models may be set according to the predetermined objective, such as an improvement in accuracy for the task, an improvement in latency reduction for the task, an improvement in resource consumption for the task under the condition of the current workload related to the task and the current resource capacity in the computing environment 400.

Figure 7A:
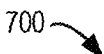
FIG. 7A depicts an example initial action table, in accordance with embodiments of the present disclosure.

Specifically, the master node 420 may obtain an initial action table, such as an initial action table 700 as illustrated in FIG. 7A. According to the initial action table 700, an initial probability of upgrading the inference model M0 is 1 and an initial probability of downgrading the inference model M0 is 0 because the inference model M0 has the lowest quality of service. The initial probabilities of upgrading and downgrading the inference model M1 are set to be equal to each other, for example, 0.5. An initial probability of upgrading the inference model M2 is 0 and an initial probability of downgrading the inference model M0 is 1 because the inference model M2 has the highest quality of service.

Figure 7B:
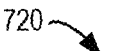
FIG. 7B depicts an example reward-model_choose_times table, in accordance with embodiments of the present disclosure.

The master node 420 may also initialize a reward-model_choose_times table randomly, which indicates the exploitation times of each inference model M0, M1, M2, and the reward obtained when the corresponding inference model is exploited. FIG. 7B shows an example reward-model_choose_times table 720.

The master node 420 may perform the exploitation and exploration iteratively. One round of iteration is described in the following.

Specifically, in a round of iteration, the master node 420 chooses an inference model with the best reward as an exploitation model, such as the inference model M1 with the reward of 0.8 in the initial reward-model_choose_times table 720. The master node 420 randomly chooses an inference model from the remaining inference models as an exploration model. The master node 420 may then determine a candidate action table indicating respective candidate model update suggestions for the inference models M0, M1, and M2 by weighting the exploration model and the exploitation model with a predetermined exploration weight and a predetermined exploitation weight.

The master node 420 may further measure a reward earned by the candidate action table, for example, a reward if the respective candidate model update suggestions are performed by the inference agents 430. As mentioned above, such a reward may indicate an improvement in accuracy for the task, an improvement in latency reduction for the task, an improvement in resource consumption for the task under the condition of the current workload related to the task and the current resource capacity in the computing environment 400.

The master node 420 may use the reward to update the reward-model_choose_times table, for example, to update the reward of the exploitation model in the current round of iteration. The updated reward-model_choose_times table and the candidate action table in the current round of iteration may be used as an initial reward-model_choose_times table and an initial action table for a subsequent round of iteration. The iteration process may be performed continuously or for a predetermined number of iterations or for a predetermined amount of time.

The master node 420 may decide to update the inference models executed on the inference agent 430 periodically. Each time the update is to be performed, the master node 420 may obtain the candidate action table determined in the iteration process of the exploration and exploitation to determine the model update information 422.

In addition to the exploit-explore trade-off policy, or as alternatives, the master node may employ other algorithms to determine the model update suggestions for the inference models.

Figure 8A:
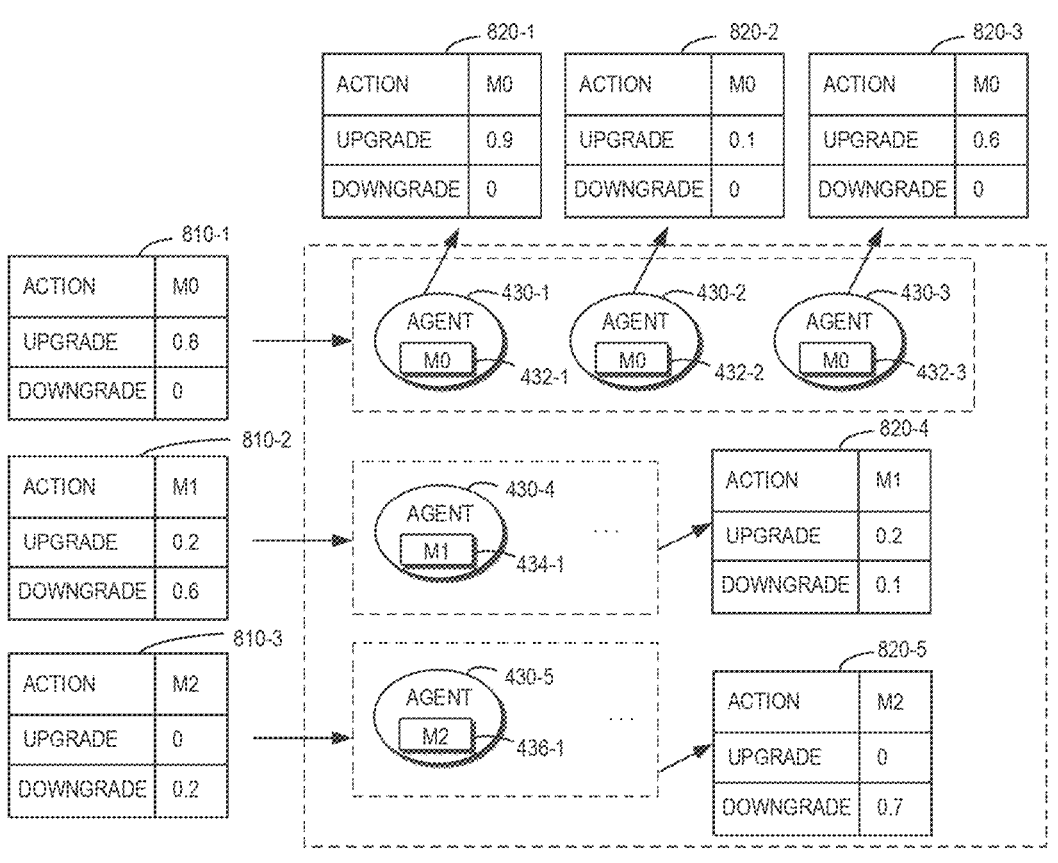
FIG. 8A depicts an example of model update action determination by inference agents, in accordance with embodiments of the present disclosure.

The determined model update information 422 is distributed by the master node 420 to the inference agents 430 to guide their local model update operations. In some embodiments, an inference agent 430 may receive a related part of the model update information 422. For example, as illustrated in FIG. 8A, a part 810-1 of the action table in FIG. 5 indicates a model update suggestion for the inference model (M0) 412 and thus may be provided to the inference agents 430-1, 430-2, and 430-3 which have the instances of the inference model (M0) 412 launched and executed thereon. A part 810-2 of the action table in FIG. 5 indicates a model update suggestion for the inference model (M1) 414 and thus may be provided to the inference agent 430-4 which has the instance of the inference model (M1) 414 launched and executed thereon. A part 810-3 of the action table, which indicates a model update suggestion for the inference model (M2) 416, may be provided to the inference agent 430-5 which has an instance of the inference model (M2) 416 launched and executed thereon.

In some other embodiments, the whole model update information 422 may be provided to each inference agent 430, and the related part may be utilized by the inference agent 430.

Upon receipt of the model update information 422 or a part thereof, an inference agent 430 may perform a model update under the direction of the model update suggestion indicated by the model update information 422 for the corresponding inference model. In some embodiments, the inference agent 430 may directly follow the model update suggestion and perform a model update action of upgrade or downgrade accordingly on the instance of the corresponding inference model. In some embodiments, an inference agent 430 may determine a model update action further based on one more other local factors, such as the pending workload scheduled to be performed by the inference agent 430, an amount of available resources for the inference agent 430, and/or the like.

In some embodiments, an inference agent 430 may determine a local action table for the inference model 412, 414, or 416 executed thereon by considering some local factors and the model update suggestion from the master node 420. The local action table may indicate probabilities of upgrading or downgrading the inference model determined by the inference agent 430. The local action table may be determined based on the model update suggestion from the master node 420 and an update algorithm determined by considering the one or more factors and/or by considering a random value.

In accordance with at least one embodiment of the present disclosure, such probabilities may indicate the likelihood that the inference model will be upgraded or downgraded. In accordance with at least one embodiment of the present disclosure, such probabilities may indicate scores or quantitative values which can be compared with predetermined thresholds to determine whether or not the inference model will be upgraded or downgraded. In accordance with at least one embodiment of the present disclosure, such probabilities may indicate a probability of resulting success if the inference model is upgraded or downgraded.

For example, as illustrated in FIG. 8A, upon receipt of the part 810-1 of the action table from the master node 420, the inference agent 430-1 determines a local action table 820-1 which indicates upgrading the inference model M0 with a probability of 0.9, which is higher than the probability of 0.8 as indicated in the part 810-1. This is because the inference agent 430-1 has less pending workload to process. The inference agent 430-2 may determine a local action table 820-2 which indicates upgrading the inference model M0 with a probability of 0.1, which is much lower than the probability of 0.8 as indicated in the part 810-1, because the inference agent 430-2 has a large amount of workload to process. Similarly, the inference agents 430-3, 430-4, and 430-5 may determine their local action tables 820-3, 820-4, and 820-5.

The inference agents 430-1 to 430-5 may determine the actual model update actions to be performed on their executed instances of inference models based on the local action tables. In general, if the local action table indicates a relative high probability of upgrading the inference model to another inference model, the inference agent 430 may have a higher likelihood to perform a model update action of upgrade. Otherwise, the inference agent 430 may perform a model update action of downgrade or may perform no model update.

In some embodiments, if an inference agent 430 determines a model update action of upgrade or downgrade, the inference agent 430 may discard the instance of the inference model that is currently executed thereon, and launch a new instance of the upgraded or downgraded inference model, from example, from the model repository 410.

Figure 8B:
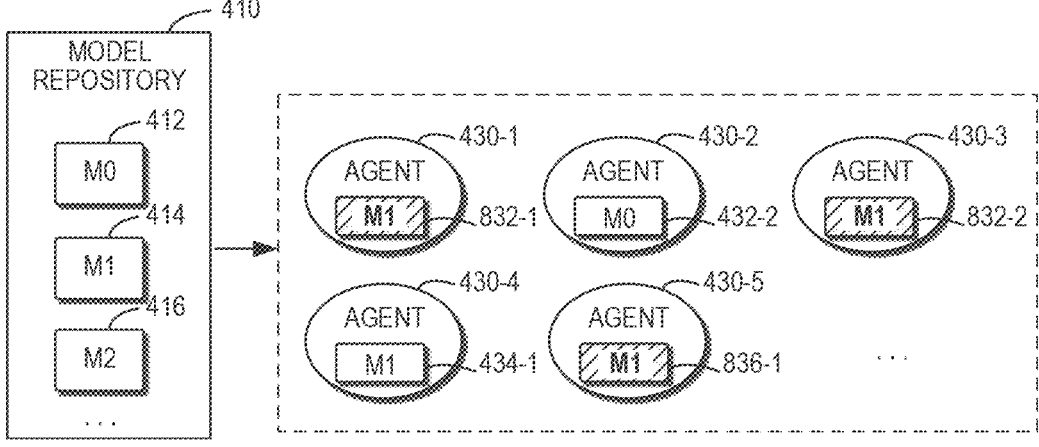
FIG. 8B depicts an example of model updates performed by inference agents, in accordance with embodiments of the present disclosure.

FIG. 8B depicts an example of model updates performed by inference agents according to some embodiments of the present disclosure. As illustrated, the inference agents 430-1 and 430-3 decide to perform a model update action of upgrading the inference model M0 to an inference model M1, and thus new instances 832-1 and 832-2 of the inference model M1 are launched accordingly. The inference agent 430-5 decides to perform a model update action of downgrading the inference model M2 to an inference model M1, and thus launches a new instance 836-1 of the inference model M1 thereon.

Figure 9:
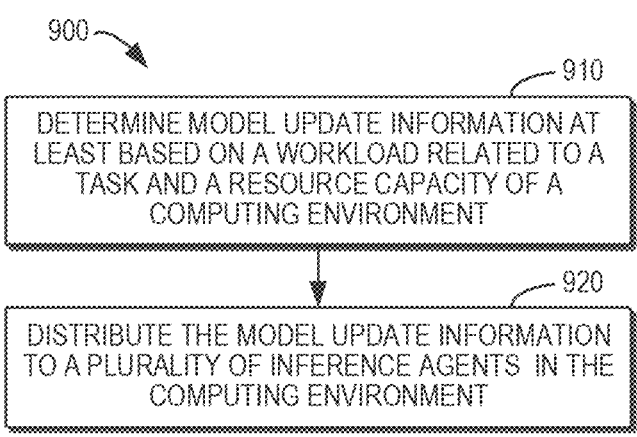
FIG. 9 depicts a flowchart of an example method, in accordance with embodiments of the present disclosure.

According to the embodiments of the present disclosure, the master node 420 may periodically determine and then distribute the model update information responsive to the workload change and/or the resource capacity change in the computing environment 400, in order to achieve inference optimization. The multiple inference agents 430 may dynamically update their executed inference under the direction of the updated model update information to adapt to the workload change and/or the resource capacity change FIG. 9 shows a flowchart of an example method 900 according to some embodiments of the present disclosure. The method 900 can be implemented at the master node 420 as shown in FIG. 4. For the purpose of discussion, the method 900 will be described from the perspective of the master node 420.

At block 910, the master node 420 determines model update information at least based on a workload related to a task and a resource capacity of a computing environment. The model update information indicates respective model update suggestions for a plurality of inference models which are configured to perform the task.

At block 920, the master node 420 distributes the model update information to a plurality of inference agents 430 in the computing environment. The plurality of inference agents 430 have a plurality of instances of the plurality of inference models executed thereon.

In some embodiments, the respective model update suggestions comprise at least one of the following: a first probability of upgrading a first inference model of the plurality of inference models to a second inference model of the plurality of inference models, the first inference model having a lower quality of service and/or a lower resource consumption level than the second inference model; and a second probability of downgrading the first inference model to a third inference model of the plurality of inference models, the first inference model having a higher quality of service and/or a higher resource consumption level than the third inference model.

In some embodiments, a quality of service of the first inference model comprises at least one of an accuracy level and a latency level in processing the workload.

In some embodiments, distributing the model update information comprises: in accordance with a determination that a first inference agent of the plurality of inference agents has an instance of a first inference model of the plurality of inference models, providing a part of the model update information related to the first inference model to the first inference agent.

In some embodiments, determining the model update information comprises determining the model update information further based on at least one of the following: respective qualities of service of the plurality of inference models and respective resource consumption levels of the plurality of inference models.

In some embodiments, determining the model update information comprises determining the model update information by applying an exploit-explore trade-off policy.

In some embodiments, determining the model update information by applying the exploit-explore trade-off policy comprises: (i) determining respective candidate model update suggestions for the plurality of inference models; (ii) determining a reward of the respective candidate model update suggestions, the reward indicating an expected improvement level to a predetermined objective in a condition of the workload and the resource capacity; and (iii) determining the model update information based on the reward.

In some embodiments, the model update information is determined and distributed periodically.

Figure 10:
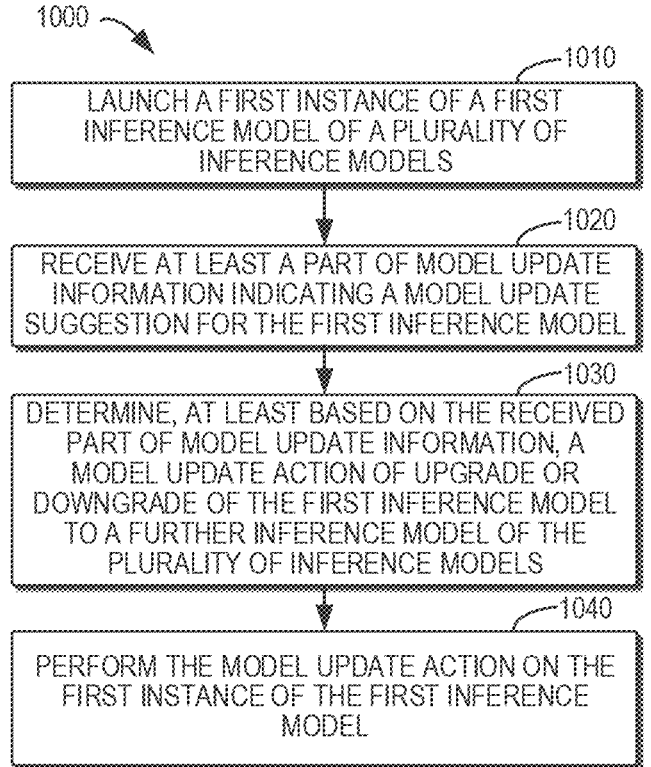
FIG. 10 depicts a flowchart of an example method, in accordance with embodiments of the present disclosure.

FIG. 10 shows a flowchart of an example method 1000 according to some embodiments of the present disclosure. The method 1000 can be implemented at an inference agent 430 as shown in FIG. 4. For the purpose of discussion, the method 1000 will be described from the perspective of the inference agent 430.

At block 1010, the inference agent 430 launches a first instance of a first inference model of a plurality of inference models, the plurality of inference models configured to perform a task. At block 1020, the inference agent 430 receives, from a master node 420, at least a part of model update information indicating a model update suggestion for the first inference model.

At block 1030, the inference agent 430 determines, at least based on the received part of model update information, a model update action of upgrade or downgrade of the first inference model to a further inference model of the plurality of inference models. At block 1040, the inference agent 430 performs the model update action on the first instance of the first inference model.

In some embodiments, the model update suggestion comprises at least one of the following: a first probability of upgrading the first inference model to a second inference model of the plurality of inference models, the first inference model having a lower quality of service and/or a lower resource consumption level than the second inference model; and a second probability of downgrading the first inference model to a third inference model of the plurality of inference models, the first inference model having a higher quality of service and/or a higher resource consumption level than the third inference model.

In some embodiments, a quality of service of the first inference model comprises at least one of an accuracy level and a latency level in processing the workload.

In some embodiments, performing the model update action comprises, in accordance with a determination that the model update action indicates the upgrade or the downgrade, launching a second instance of the further inference model on the inference agent.

It should be noted that the processing of multi-agent inference according to the embodiments of this disclosure could be implemented by computer system/server 12 of FIG.

1. In some embodiments, the master node 420 and/or the inference agents 430 could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a master node, model update information at least based on a workload related to a task and a computing resource capacity of a computing environment including a total amount of resources that are available for processing the task, the model update information indicating respective model update suggestions for a plurality of inference models configured to perform the task, the master node configured to operate as a multi-agent master to perform inference model optimization based on the workload and the computing resource capacity of the computing environment including a total amount of resources that are available for processing the task, wherein the plurality of inference models are generated from trained models using a machine learning algorithm; and
   distributing, by the master node, the model update information to a plurality of inference agents in the computing environment, the inference agents being physical or virtual entities to which the computing resource capacity of the computing environment including a total amount of resources that are available for processing the task are allocated, the plurality of inference agents having a plurality of instances of the plurality of inference models executed thereon,
   wherein the master node balances quality of service, including accuracy and latency, and computing resource consumption by controlling respective numbers of instances of the plurality of inference models executed in the computing environment,
   wherein the computing resource capacity of the computing environment including a total amount of resources that are available for processing the task comprises at least one of networks, network bandwidth, servers, processing, memory, storage, operating systems, applications, application software licenses, active user accounts and virtual machines, and
   wherein each of the plurality of inference agents generates a local action table for the inference models executed thereon by considering both a plurality of local factors and the respective model update suggestion from the master node, wherein the plurality of local factors include an update algorithm determined by considering a random value, and each of the plurality of inference agents determines actual model update actions to be performed on their executed instances of inference models based on their local action table.

2. The method of claim 1, wherein the respective model update suggestions comprise at least one of the following:
   a first probability of upgrading a first inference model of the plurality of inference models to a second inference model of the plurality of inference models, the first inference model having at least one of a lower quality of service or a lower computing resource consumption level than the second inference model, and a second probability of downgrading the first inference model to a third inference model of the plurality of inference models, the first inference model having at least one of a higher quality of service or a higher computing resource consumption level than the third inference model.

3. The method of claim 2, wherein a quality of service of the first inference model comprises both an accuracy level and a latency level in processing the workload.

4. The method of claim 1, wherein distributing the model update information comprises:
   in accordance with a determination that a first inference agent of the plurality of inference agent has an instance of a first inference model of the plurality of inference models, providing a part of the model update information related to the first inference model to the first inference agent.

5. The method of claim 1, wherein determining the model update information comprises:
   determining the model update information further based on at least one of the following:
      respective qualities of service of the plurality of inference models, and
      respective computing resource consumption levels of the plurality of inference models.

6. The method of claim 1, wherein determining the model update information comprises:
   determining the model update information by applying an exploit-explore trade-off policy.

7. The method of claim 6, wherein determining the model update information by applying the exploit-explore trade-off policy comprises:
   determining respective candidate model update suggestions for the plurality of inference models;
   determining a reward of the respective candidate model update suggestions, the reward indicating an expected improvement level to a predetermined objective in a condition of the workload and the computing resource capacity including a total amount of resources that are available for processing the task; and
   determining the model update information based on the reward.

8. The method of claim 1, wherein the model update information is determined and distributed periodically.

9. A computer-implemented method comprising:
   launching, by an inference agent in a computing environment, a first instance of a first inference model of a plurality of inference models, the plurality of inference models configured to perform a task, wherein the inference agent is a physical or virtual entity to which a computing resource capacity of the computing environment including a total amount of resources that are available for processing the task is allocated, and wherein the plurality of inference models are generated from trained models using a machine learning algorithm;
   receiving, from a master node and by the inference agent, at least a part of model update information indicating a model update suggestion for the first inference model, wherein the master node is configured to operate as a multi-agent master to perform inference model optimization based on a workload and the computing resource capacity of the computing environment including a total amount of resources that are available for processing the task;
   determining, by the inference agent based on at least the part of model update information, a model update action of upgrade or downgrade of the first inference model to a further inference model of the plurality of inference models; and performing, by the inference agent, the model update action on the first instance of the first inference model, wherein the master node balances quality of service, including accuracy and latency, and computing resource consumption by controlling respective numbers of instances of the plurality of inference models executed in the computing environment, wherein the computing resource capacity of the computing environment including a total amount of resources that are available for processing the task comprises at least one of networks, network bandwidth, servers, processing, memory, storage, operating systems, applications, application software licenses, active user accounts and virtual machines, wherein a quality of service of the first inference model comprises both an accuracy level and a latency level in processing the workload, and wherein the inference agent generates a local action table for the inference models executed thereon by considering both a plurality of local factors and the model update suggestion from the master node, wherein the plurality of local factors include an update algorithm determined by considering a random value, and the inference agent determines actual model update actions to be performed on its executed instances of inference models based on its local action table.

10. The method of claim 9, wherein the model update information comprises at least one of:

respective qualities of service of the plurality of inference models, and respective computing resource consumption levels of the plurality of inference models.

11. The method of claim 9, wherein the model update suggestion comprises at least one of the following:

a first probability of upgrading the first inference model to a second inference model of the plurality of inference models, the first inference model having a lower quality of service and/or a lower computing resource consumption level than the second inference model, and a second probability of downgrading the first inference model to a third inference model of the plurality of inference models, the first inference model having a higher quality of service and/or a higher computing resource consumption level than the third inference model.

12. The method of claim 9, wherein performing the model update action comprises:

in accordance with a determination that the model update action indicates the upgrade or the downgrade, launching a second instance of the further inference model on the inference agent.

13. A system comprising:

one or more processing units; and a memory coupled to the one or more processing units and storing instructions thereon, the instructions, when executed by the one or more processing units, performing acts comprising:

determining model update information at least based on a workload related to a task and a computing resource capacity of a computing environment including a total amount of resources that are available for processing the task, the model update information indicating respective model update suggestions for a plurality of inference models configured to perform the task, wherein the plurality of inference models are generated from trained models using a machine learning algorithm; and distributing the model update information to a plurality of inference agents in the computing environment, the plurality of inference agents having a plurality of instances of the plurality of inference models executed thereon, wherein the inference agents are physical or virtual entities to which the computing resource capacity of the computing environment including a total amount of resources that are available for processing the task are allocated, wherein a master node configured to operate as a multi-agent master balances quality of service, including accuracy and latency, and computing resource consumption by controlling respective numbers of instances of the plurality of inference models executed in the computing environment, wherein the computing resource capacity of the computing environment including a total amount of resources that are available for processing the task comprises at least one of networks, network bandwidth, servers, processing, memory, storage, operating systems, applications, application software licenses, active user accounts and virtual machines, and wherein each of the plurality of inference agents generates a local action table for the inference models executed thereon by considering both a plurality of local factors and the respective model update suggestion from the master node, wherein the plurality of local factors include an update algorithm determined by considering a random value, and each of the plurality of inference agents determines actual model update actions to be performed on their executed instances of inference models based on their local action table.

14. The system of claim 13, wherein the respective model update suggestions comprise at least one of the following:

a first probability of upgrading a first inference model of the plurality of inference models to a second inference model of the plurality of inference models, the first inference model having a lower quality of service and/or a lower computing resource consumption level than the second inference model, and a second probability of downgrading the first inference model to a third inference model of the plurality of inference models, the first inference model having a higher quality of service and/or a higher computing resource consumption level than the third inference model.

15. The system of claim 14, wherein a quality of service of the first inference model comprises both an accuracy level and a latency level in processing the workload.

16. The system of claim 13, wherein distributing the model update information comprises:

in accordance with a determination that a first inference agent of the plurality of inference agent has an instance of a first inference model of the plurality of inference models, providing a part of the model update information related to the first inference model to the first inference agent.

17. The system of claim 13, wherein determining the model update information comprises:

determining the model update information further based on at least one of the following:

respective qualities of service of the plurality of inference models, and respective computing resource consumption levels of the plurality of inference models.

18. The system of claim 13, wherein determining the model update information comprises:

determining the model update information by applying an exploit-explore trade-off policy.

19. The system of claim 18, wherein determining the model update information by applying the exploit-explore trade-off policy comprises:

determining respective candidate model update suggestions for the plurality of inference models;

determining a reward of the respective candidate model update suggestions, the reward indicating an expected improvement level to a predetermined objective in a condition of the workload and the computing resource capacity including a total amount of resources that are available for processing the task; and determining the model update information based on the reward.

20. The system of claim 13, wherein the model update information is determined and distributed periodically.

* * * * *